(12) United States Patent
Bauer et al.

(10) Patent No.: US 11,591,031 B2
(45) Date of Patent: Feb. 28, 2023

(54) REAR-END AIR GUIDE DEVICE

(71) Applicant: Dr. Ing. h.c. F. Porsche Aktiengesellschaft, Stuttgart (DE)

(72) Inventors: Riccardo Bauer, Owen (DE); Tobias Posch, Wimsheim (DE); Philipp Appt, Weilheim an der Teck (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 75 days.

(21) Appl. No.: 17/358,010

(22) Filed: Jun. 25, 2021

(65) Prior Publication Data
US 2022/0001941 A1 Jan. 6, 2022

(30) Foreign Application Priority Data
Jul. 1, 2020 (DE) ...................... 10 2020 117 282.6

(51) Int. Cl.
*B62D 35/00* (2006.01)

(52) U.S. Cl.
CPC .................................. *B62D 35/007* (2013.01)

(58) Field of Classification Search
CPC .................................................... B62D 35/007
See application file for complete search history.

(56) References Cited

U.S. PATENT DOCUMENTS

| | | | |
|---|---|---|---|
| 4,533,168 A | 8/1985 | Janssen et al. | |
| 7,111,898 B2 * | 9/2006 | Rinklin | B62D 35/007 296/180.1 |
| 8,746,779 B1 * | 6/2014 | Mazyan | B62D 35/001 296/180.2 |
| 2005/0029835 A1 * | 2/2005 | Adams | B62D 35/007 296/180.1 |
| 2006/0043770 A1 * | 3/2006 | Preiss | B62D 35/007 296/180.1 |
| 2011/0169298 A1 * | 7/2011 | Goenueldinc | B62D 37/02 296/180.1 |
| 2011/0169299 A1 * | 7/2011 | Goenueldinc | B62D 35/007 296/180.5 |
| 2017/0361882 A1 | 12/2017 | Weber et al. | |

FOREIGN PATENT DOCUMENTS

| | | | | |
|---|---|---|---|---|
| CN | 102556183 A | * | 7/2012 | ........... B62D 35/007 |
| DE | 3132369 A1 | | 3/1983 | |
| DE | 102007061257 A1 | * | 8/2009 | ........... B62D 35/007 |
| DE | 102011011102 A1 | * | 1/2012 | ........... B62D 35/007 |
| DE | 102014110390 A1 | | 1/2016 | |
| DE | 102016111026 A1 | | 12/2017 | |
| DE | 102018114519 A1 | | 12/2019 | |
| DE | 102019103451 B3 | * | 6/2020 | |
| DE | 102019103451 B3 | | 6/2020 | |
| EP | 199010 A | * | 10/1986 | ........... B62D 35/007 |
| EP | 1559641 A2 | * | 8/2005 | ........... B62D 35/007 |
| EP | 1630080 A2 | * | 3/2006 | ........... B62D 35/007 |
| FR | 2511331 A1 | * | 2/1983 | ........... B62D 35/007 |
| JP | H 1134936 A | | 2/1999 | |

\* cited by examiner

*Primary Examiner* — Lori L Lyjak
(74) *Attorney, Agent, or Firm* — Leydig, Voit & Mayer, Ltd.

(57) ABSTRACT

A rear-end air guide device for a motor vehicle includes a rear spoiler having a spoiler surface and a rear wing arranged in a vehicle vertical direction above the rear spoiler. The spoiler surface faces toward the rear wing, and the spoiler surface facing toward the rear wing is adjustable in a vehicle longitudinal direction.

10 Claims, 1 Drawing Sheet

REAR-END AIR GUIDE DEVICE

CROSS REFERENCE TO RELATED APPLICATIONS

This application claims benefit to German Patent Application No. DE 10 2020 117 282.6, filed on Jul. 1, 2020, which is hereby incorporated by reference herein.

FIELD

The present disclosure relates to a rear-end air guide device for a motor vehicle, having a rear spoiler and having a rear wing which is arranged in a vehicle vertical direction above the rear spoiler, which has a spoiler surface facing toward the rear wing. The present disclosure furthermore relates to a method for operating a rear-end air guide device of said type and to a motor vehicle having a rear-end air guide device of said type.

BACKGROUND

The German published patent application DE 10 2016 111 026 A1 has disclosed a vehicle part structure having at least one wing device for generating at least one underflow and at least one overflow from an incident flow of air for the purposes of improving downforce and having at least one air guide device for splitting up the incident flow of air into at least one wing air stream for the underflow of the wing device and into at least one part air stream for at least one vehicle component, wherein the air guide device comprises at least one adaptable air guide element, wherein a distribution ratio of wing air stream and part air stream can be flexibly adjusted by means of at least one adaptation of the air guide element.

SUMMARY

In an embodiment, the present disclosure provides a rear-end air guide device for a motor vehicle. The rear-end guide device includes a rear spoiler having a spoiler surface and a rear wing arranged in a vehicle vertical direction above the rear spoiler. The spoiler surface faces toward the rear wing, and the spoiler surface facing toward the rear wing is adjustable in a vehicle longitudinal direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
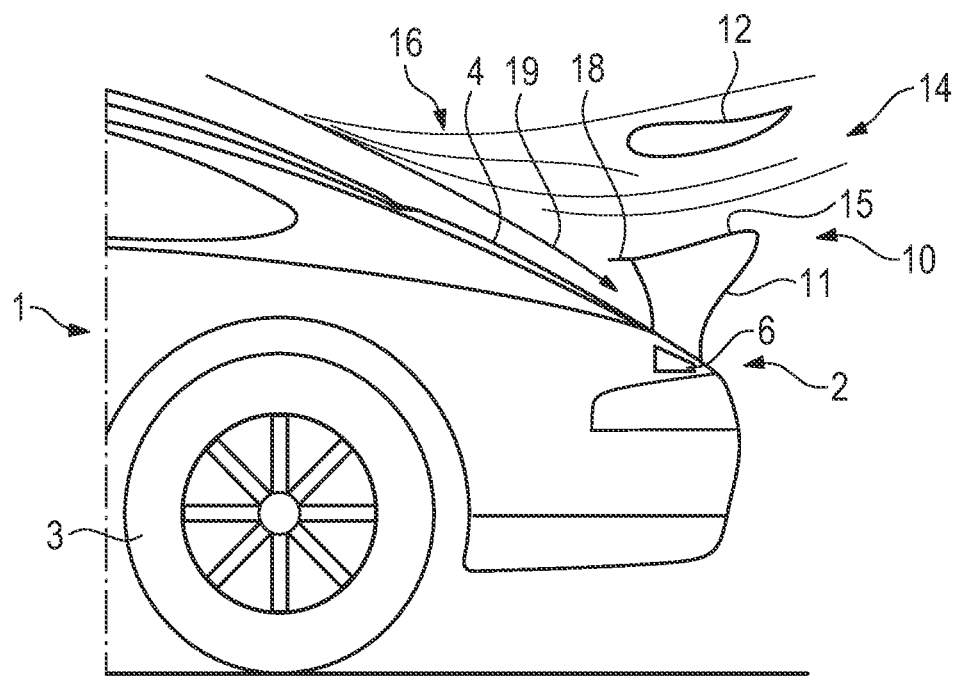
FIG. 1 shows a rear end of a motor vehicle with a rear-end air guide device, which comprises a rear spoiler and a rear wing, in a first operating position.

The present disclosure relates to a rear-end air guide device for a motor vehicle, having a rear spoiler and having a rear wing which is arranged in a vehicle vertical direction above the rear spoiler, which has a spoiler surface facing toward the rear wing, in particular with regard to operation on a motor vehicle.

The rear-end air guide device for a motor vehicle has a rear spoiler and a rear wing which is arranged in a vehicle vertical direction above the rear spoiler, which has a spoiler surface facing toward the rear wing, in that the spoiler surface facing toward the rear wing is designed to be adjustable in a vehicle longitudinal direction. The vehicle longitudinal direction is also referred to as x direction. A vehicle transverse direction is also referred to as y direction. The vehicle vertical direction is also referred to as z direction. The rear spoiler and the rear wing together form a double wing on the motor vehicle. The rear spoiler serves to form a main profile of the double wing. The rear wing serves to form a secondary profile of the double wing. By means of the adjustability, in the vehicle longitudinal direction, of the spoiler surface facing toward the rear wing, different requirements during the operation of the motor vehicle can be easily satisfied more effectively than with conventional rear-end air guide devices.

A preferred exemplary embodiment of the rear-end air guide device is characterized in that the spoiler surface facing toward the rear wing is adjustable rearward in the vehicle longitudinal direction such that an amount of downforce during the operation of the motor vehicle is increased. With regard to the spoiler surface facing toward the rear wing, "adjustable rearward" means in particular that the spoiler surface facing toward the rear wing is lengthened rearward in the vehicle longitudinal direction. Here, the spoiler surface facing toward the rear wing is for example displaced rearward in the vehicle longitudinal direction. The spoiler surface facing toward the rear wing may however also be lengthened rearward in the vehicle longitudinal direction in some other way.

A further preferred exemplary embodiment of the rear-end air guide device is characterized in that the spoiler surface facing toward the rear wing is adjustable forward in the vehicle longitudinal direction such that more charge air is fed to a charge-air cooler that is arranged in the vehicle vertical direction below the rear spoiler. With regard to the spoiler surface facing toward the rear wing, "adjustable forward" means in particular that the spoiler surface facing toward the rear wing is lengthened forward in the vehicle longitudinal direction.

A further preferred exemplary embodiment of the rear-end air guide device is characterized in that the rear spoiler is adjustable between a retracted position and an extended position. The rear spoiler, in its retracted position, has no function or only an insignificant function with regard to an air flow during the operation of the motor vehicle. The rear spoiler is preferably extended from its retracted position into its extended position only at relatively high speeds in order to influence the air flow during the operation of the motor vehicle, in particular with regard to an improvement in the downforce of the motor vehicle.

A further preferred exemplary embodiment of the rear-end air guide device is characterized in that the rear wing is adjustable between a retracted position and an extended position. The adjustment of the rear wing may be coupled to the adjustment of the rear spoiler. The adjustment of the rear wing may however also take place independently of an adjustment of the rear spoiler.

A further preferred exemplary embodiment of the rear-end air guide device is characterized in that a trailing edge of the rear spoiler is displaceable rearward in the vehicle longitudinal direction when the rear spoiler is extended. In this way, the downforce of the motor vehicle during operation can be increased in an effective manner.

A further preferred exemplary embodiment of the rear-end air guide device is characterized in that the trailing edge of the rear spoiler is displaceable upward in the vehicle vertical direction when the rear spoiler is extended. In this way, the downforce of the motor vehicle during operation can be further improved.

In the case of a method for operating an above-described rear-end air guide device on a motor vehicle, the spoiler surface facing toward the rear wing is adjusted rearward or forward in the vehicle longitudinal direction. Different requirements during the operation of the motor vehicle can thus be easily satisfied more effectively than with conventional rear-end air guide devices.

The present disclosure furthermore relates to a rear spoiler and/or a rear wing for an above-described rear-end air guide device. The rear spoiler and the rear wing can be marketed separately.

The present disclosure furthermore relates to a motor vehicle having an above-described rear-end air guide device. The motor vehicle is preferably a sports car with a rear-mounted engine. The motor vehicle may however also be equipped with a front-mounted engine or with a mid-mounted engine.

Figure 2:
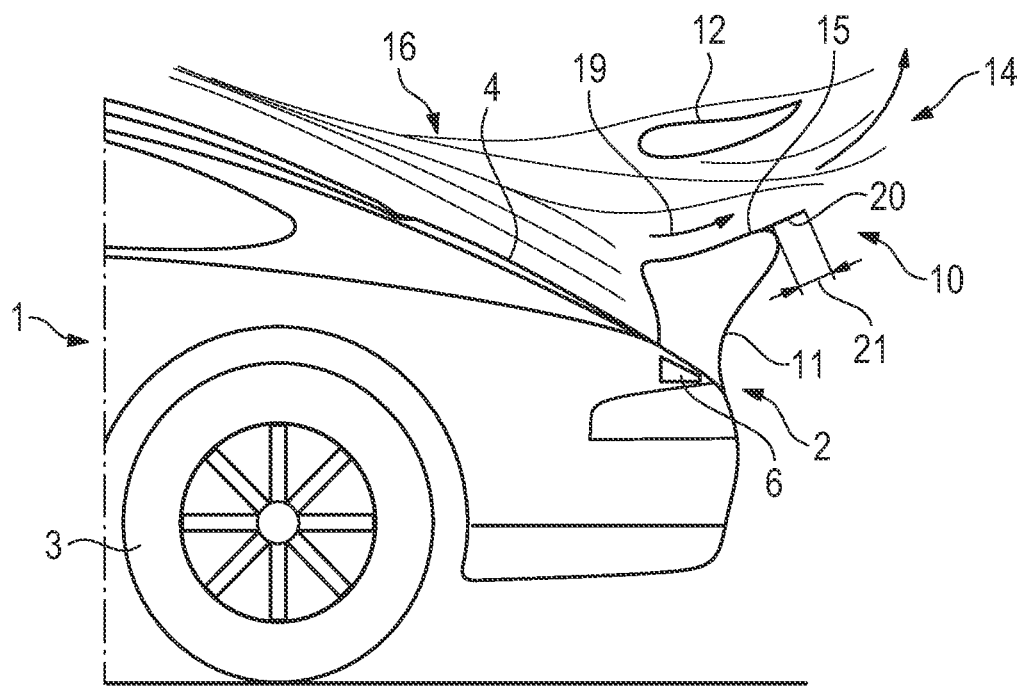
FIG. 2 shows the rear-end air guide device from FIG. 1 in a second operating position.

FIGS. 1 and 2 illustrate a rear end 2 of a motor vehicle 1 with a rear wheel 3 and a tailgate 4. A charge-air cooler 6 is indicated in the rear end 2 of the motor vehicle 1. A rear-end air guide device 10 is arranged above the charge-air cooler 6. The rear-end air guide device 10 comprises a rear spoiler 11 and a rear wing 12.

The rear spoiler 11 is arranged above the charge-air cooler 6. The rear wing 12 is arranged above the rear spoiler 11. The rear spoiler 11 and the rear wing 12 serve to form a double wing 14 on the rear end 2 of the motor vehicle 1.

Arrows are used in FIGS. 1 and 2 to indicate air flows 16 which arise during the operation of the motor vehicle 1 and which can be influenced by the rear-end air guide device 10 in order to satisfy different requirements during the operation of the motor vehicle 1.

According to one aspect of the disclosure, a spoiler surface 15, facing toward the rear wing 12, of the rear spoiler 11 can be adjusted in targeted fashion in order to satisfy the different requirements during the operation of the motor vehicle 1 in a particularly effective manner.

It can be seen in FIG. 1 that a leading edge 18 of the spoiler surface 15 of the rear spoiler 11 has been displaced forward in a vehicle longitudinal direction or x direction. As a result of this lengthening of the spoiler surface 15 of the rear spoiler 11, the rear spoiler 11 is lengthened forward, so to speak. As a result, in turn, the air supply to the charge-air cooler 6 during the operation of the motor vehicle 1 is improved, as indicated in FIG. 1 by an arrow 19.

The rear spoiler 11 is advantageously movable between a retracted position and an extended position. In the retracted position, the double wing 14 with the rear spoiler 11 is preferably optimized with regard to the running resistance of the motor vehicle 1 during operation. If the rear spoiler 11 of the double wing 14 is extended, the downforce of the motor vehicle 1 during operation is advantageously increased, as can be seen in FIG. 2.

It can be seen in FIG. 2 that a trailing edge 20 of the spoiler surface 15 of the rear spoiler 11 has been displaced rearward, that is to say in the vehicle longitudinal direction or x direction, and upward, that is to say in the vehicle vertical direction or z direction. In this way, the downforce of the motor vehicle 1 can be increased in an effective manner. A dimension line 21 is used to indicate the extent to which the trailing edge 20 of the spoiler surface 15 of the rear spoiler 11 is displaced rearward and upward in order to increase the downforce.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rear-end air guide device for a motor vehicle, comprising:
   a rear spoiler having a spoiler surface; and
   a rear wing arranged in a vehicle vertical direction above the rear spoiler,
   wherein the spoiler surface faces toward the rear wing, and
   wherein the spoiler surface facing toward the rear wing is adjustable in a vehicle longitudinal direction.

2. The rear-end air guide device as claimed in claim 1, wherein the spoiler surface facing toward the rear wing is adjustable rearward in the vehicle longitudinal direction, wherein a rearward adjustment of the spoiler surface is configured to increase an amount of downforce during the operation of the motor vehicle.

3. The rear-end air guide device as claimed in claim 1, wherein the spoiler surface facing toward the rear wing is adjustable forward in the vehicle longitudinal direction, wherein a forward adjustment of the spoiler surface is configured to increase an amount of charge air fed to a charge-air cooler arranged, in the vehicle vertical direction, below the rear spoiler.

4. The rear-end air guide device as claimed in claim 1, wherein the rear spoiler is adjustable between a retracted position and an extended position.

5. The rear-end air guide device as claimed in claim 1, wherein the rear wing is adjustable between a retracted position and an extended position.

6. The rear-end air guide device as claimed in claim 5, wherein a trailing edge of the rear spoiler is displaceable rearward in the vehicle longitudinal direction when the rear spoiler is extended.

7. The rear-end air guide device as claimed in claim 6, wherein the trailing edge of the rear spoiler is displaceable upward in the vehicle vertical direction when the rear spoiler is extended.

8. A method for operating a rear-end air guide device as claimed in claim 1, the method comprising adjusting, rearward or forward in the vehicle longitudinal direction, the spoiler surface facing toward the rear wing.

9. A rear spoiler and/or rear wing for a rear-end air guide device as claimed in claim 1.

10. A motor vehicle having a rear-end air guide device as claimed in claim 1.

\* \* \* \* \*